(12) United States Patent
Liu (10) Patent No.: US 11,025,062 B2
(45) Date of Patent: Jun. 1, 2021

(54) APPARATUS FOR USE IN A MICROGRID AND METHODS OF OPERATING THE SAME

(71) Applicant: Entrust Smart Home Microgrid Ltd, Lancashire (GB)

(72) Inventor: Xiongwei Liu, Lancaster (GB)

(73) Assignee: ENTRUST SMART HOME MICROGRID LTD., Lancaster (GB)

(*) Notice: Subject to any disclaimer, the term of this patent is extended or adjusted under 35 U.S.C. 154(b) by 10 days.

(21) Appl. No.: 16/466,633

(22) PCT Filed: Dec. 1, 2017

(86) PCT No.: PCT/GB2017/053640
§ 371 (c)(1),
(2) Date: Jun. 4, 2019

(87) PCT Pub. No.: WO2018/100398
PCT Pub. Date: Jun. 7, 2018

(65) Prior Publication Data
US 2019/0348838 A1     Nov. 14, 2019

(30) Foreign Application Priority Data

Dec. 4, 2016 (GB) ..................... 1620592

(51) Int. Cl.
*H02J 3/14* (2006.01)
*B60L 53/20* (2019.01)
(Continued)

(52) U.S. Cl.
CPC ............... *H02J 3/14* (2013.01); *B60L 53/20* (2019.02); *H02J 1/14* (2013.01); *H02J 3/383* (2013.01);
(Continued)

(58) Field of Classification Search
None
See application file for complete search history.

(56) References Cited

U.S. PATENT DOCUMENTS

2012/0146587 A1\* 6/2012 Srinivasan ........ H01M 8/04925
320/138
2012/0257429 A1 10/2012 Dong et al.
(Continued)

FOREIGN PATENT DOCUMENTS

| CN | 104578123 A | 4/2015 |
| CN | 104578133 A | 4/2015 |
| CN | 104600807 A | 5/2015 |

OTHER PUBLICATIONS

International Search Report and Written Opinion of Application No. PCT/GB2017/053640, Filed Dec. 1, 2017 (13 pages.).
(Continued)

*Primary Examiner* — Lincoln D Donovan
*Assistant Examiner* — Khareem E Almo
(74) *Attorney, Agent, or Firm* — Patent Law Works LLP (57) ABSTRACT

Apparatus for use in a microgrid, which comprises a DC bus with at least one DC power source connected thereto, an AC bus connected to a mains power grid that supplies the microgrid, and a DC/AC converter coupling the DC bus and the AC bus, wherein the DC/AC converter may be a one-way DC/AC inverter or a bidirectional DC/AC converter, the apparatus comprising a control system, which is configured to control number (at least one) DC power converters, each of which is configured to couple a respective controllable DC load to the DC bus, and to control the power flowing from the DC bus to each of the number controllable DC loads, so as to control each of the number controllable DC loads to fulfil its function and the voltage on the DC bus.

20 Claims, 7 Drawing Sheets

(51) Int. Cl.
*H02J 1/14* (2006.01)
*H02J 3/38* (2006.01)
*H02J 7/00* (2006.01)
*H02P 27/06* (2006.01)
*H02J 3/00* (2006.01)

(52) U.S. Cl.
CPC ............ *H02J 3/386* (2013.01); *H02J 7/0068* (2013.01); *H02P 27/06* (2013.01); *B60L 2210/10* (2013.01); *B60L 2210/40* (2013.01); *H02J 3/003* (2020.01); *H02J 2310/64* (2020.01)

(56) References Cited

U.S. PATENT DOCUMENTS

| | | | |
|---|---|---|---|
| 2012/0267952 A1* | 10/2012 | Ballatine | H02J 3/387 307/26 |
| 2012/0326668 A1* | 12/2012 | Ballatine | H02J 4/00 320/109 |
| 2014/0103724 A1 | 4/2014 | Wagoner | |
| 2014/0300185 A1 | 10/2014 | Buchstaller et al. | |
| 2016/0006253 A1 | 1/2016 | Saussele et al. | |
| 2017/0250568 A1* | 8/2017 | Gross | H01M 8/0668 |
| 2017/0366011 A1* | 12/2017 | Li | H02J 3/381 |
| 2019/0052094 A1* | 2/2019 | Pmsvvsv | H02J 3/46 |
| 2020/0235580 A1* | 7/2020 | McDonnell | H02J 3/32 |

OTHER PUBLICATIONS

Examiner Report of Application No. GB1620592.4, dated Feb. 21, 2017 (11 pages).

\* cited by examiner

APPARATUS FOR USE IN A MICROGRID AND METHODS OF OPERATING THE SAME

TECHNICAL FIELD

This specification relates generally to electric power systems for renewable power systems, particularly solar photovoltaic power system and wind power system, and micro electric power networks or microgrids.

BACKGROUND

In recent times, there has been growing interest in distributed and embedded renewable power systems, such as wind power systems and solar photovoltaic power systems, constructed independently or in built/community environment. Renewable energy sources, such as wind energy and solar energy sources, are typically intermittent, uncontrollable and even unpredictable, therefore significantly impact on the electricity distribution networks. For distributed renewable power systems, there is a need to improve the power quality to the distribution networks and reduce grid connection capacity requirement, and for built/community renewable power systems, there is a need to increase self-consumption of on-site or local renewable power generation so that the distribution networks can accommodate more renewable power generation.

SUMMARY

In a first aspect, this specification describes apparatus for use in a microgrid which comprises a DC bus with at least one DC power source connected thereto, an AC bus connected to a mains power grid that supplies the microgrid, and a DC/AC converter coupling the DC bus and the AC bus, wherein the DC/AC converter may be a one-way DC/AC inverter or a bidirectional DC/AC converter, the apparatus comprising a control system, which is configured to control a number of (at least one) DC power converters, each of which is configured to couple a respective controllable DC load to the DC bus, and to control the power flowing from the DC bus to each of the number of controllable DC loads, so as to control each of the number of controllable DC loads to fulfil its function and the voltage on the DC bus.

The control system may be configured to control the voltage on the DC bus through balancing the power flowing to and from the DC bus by coordinative controlling of the power flowing to at least two controllable DC loads through the respective coupling DC power converters.

A controllable DC load may be a resistor and the respective coupling DC power converter may be configured to be a DC/DC converter.

A controllable DC load may be a DC motor and the respective coupling DC power converter may be configured to be a DC/DC converter.

A controllable DC load may be an induction motor and the respective coupling DC power converter may be configured to be a DC/AC frequency inverter.

A controllable DC load may be the batteries of an electric vehicle, EV, and the respective coupling DC power converter may be configured to be a DC EV charger.

The control system may be configured to control the voltage on the DC bus through balancing the power flowing to and from the DC bus by coordinative controlling of the power flowing to the number of controllable DC loads through the respective coupling DC power converters and the power flowing through the DC/AC converter.

The apparatus may further comprise at least one battery storage configured to connect to the DC bus.

The control system may be configured to control the voltage on the DC bus through balancing the power flowing to and from the DC bus by coordinative controlling of the power flowing to and from the at least one battery storage and the power flowing to the number of controllable DC loads through the respective coupling DC power converters.

The control system may be configured to control the voltage on the DC bus through balancing the power flowing to and from the DC bus by coordinative controlling of the power flowing to and from the at least one battery storage and the power flowing to the number of controllable DC loads through the respective coupling DC power converters and the power flowing through the DC/AC converter.

The apparatus may further comprise at least one bidirectional energy storage charger configured to couple a specific energy storage and the DC bus and to control the charging and discharging of the specific energy storage.

The control system may be configured to control the voltage on the DC bus through balancing the power flowing to and from the DC bus by coordinative controlling of the power flowing to and from the at least one energy storage through the coupling bidirectional energy storage charger and the power flowing to the number of controllable DC loads through the respective coupling DC power converters.

The control system may be configured to control the voltage on the DC bus through balancing the power flowing to and from the DC bus by coordinative controlling of the power flowing to and from the at least one energy storage through the coupling bidirectional energy storage charger and the power flowing to the number of controllable DC loads through the respective coupling DC power converters and the power flowing through the DC/AC converter.

The control system may be configured to control the voltage on the DC bus through balancing the power flowing to and from the DC bus by coordinative controlling of the power flowing to and from the at least one battery storage and the power flowing to and from the at least one energy storage through the coupling bidirectional energy storage charger and the power flowing to the number of controllable DC loads through the respective coupling DC power converters and the power flowing through the DC/AC converter.

The at least one energy storage may be configured to be a battery storage, and the coupling bidirectional energy storage charger may be configured to be a bidirectional DC/DC battery charger.

The at least one energy storage may be configured to be the batteries of an electric vehicle, EV, and the coupling bidirectional energy storage charger may be configured to be a smart bidirectional DC/DC EV charger or a smart EV charger.

The control system may be configured to control the voltage on the DC bus through balancing the power flowing to and from the DC bus by coordinative controlling of the power flowing to some, but not all, of the number of controllable DC loads.

The apparatus may include the number of (at least one) DC power converters.

In a second aspect, this specification describes a method of controlling a microgrid which comprises a DC bus with at least one DC power source connected thereto, an AC bus connected to a mains power grid that supplies the microgrid, loads including at least one controllable DC load and a DC/AC converter coupling the DC bus and the AC bus, the method comprising controlling number of (at least one) DC power converters, each of which is configured to couple a respective controllable DC load to the DC bus, and controlling the power flowing from the DC bus to each of the of controllable DC loads, so as to control each of the number of controllable DC loads to fulfil its function and the voltage on the DC bus.

The microgrid may further comprise at least one energy storage, and the method may comprise periodically updating a power demand forecast from the loads and a power generation forecast from the at least one DC power source, and periodically scheduling power flow profiles for the power flowing to and from the DC bus which satisfy a set of first level control objectives for a defined time window, based at least in part on the power demand forecast from the loads and the power generation forecast from the at least one DC power source.

The method may comprise periodically updating a monitored average power demand from the loads and monitored average power generation from the at least one DC power source for a previous time interval, and periodically determining the power flowing through the DC/AC converter and the power flowing to and from the at least one energy storage if available and which satisfies a set of second level control objectives, based at least in part on the scheduled power flow profiles for the power flowing to and from the DC bus for a present time period, and on the average power demand from the loads and the average power generation from the at least one DC power source for the previous time interval.

The controlling the power flowing from the DC bus to each of the number of controllable DC loads may comprise continuously controlling the power flowing to each of the number of controllable DC loads to balance the power flowing to and from the DC bus and control the voltage on the DC bus based at least in part on the determined power flowing through the DC/AC converter and the determined power flowing to and from the at least one energy storage if available for a present time interval, and continuously controlling the power flowing through the DC/AC converter and the power flowing to and from the at least one energy storage if available and which satisfies a set of third level control objectives, based at least in part on the determined power flowing through the DC/AC converter and the determined power flowing to and from the at least one energy storage if available for a present time interval, and on instant changes of the power generation from the at least one DC power source and instant changes of the power flowing to the number of controllable DC loads.

The microgrid may further comprise AC loads connected to the AC bus and/or uncontrollable DC loads each connected to the DC bus either directly or indirectly through a respective DC power converter, wherein the monitored average power demand from the loads may be also based on the power demand from the AC loads and/or the uncontrollable DC loads, and the power flow profiles for the power flowing to and from the DC bus may include the power flowing to and from the at least one energy storage, the power flowing to the number of controllable DC loads and the power flowing through the DC/AC converter.

The updating power demand forecast from the loads and power generation forecast from the at least one DC power source and the scheduling power flow profiles for power flowing to and from the DC bus may be performed for at least two successive time periods within the defined time window.

The updating average power demand from the loads and the updating average power generation from the at least one DC power source and the determining power flowing through the DC/AC converter and the determining power flowing to and from the at least one energy storage if available may be performed for at least two successive time intervals within the present time period.

The set of first level control objectives may include at least in part maximising self-consumption of the power generation from the at least one DC power source by the loads in the microgrid, minimising reverse power flowing from the microgrid to the mains power grid, maximising financial benefits for end-users of the microgrid, and minimising power drawn from the mains power grid to the microgrid at high electricity tariff hours.

The set of second level control objectives may include at least in part stabilising the power flowing through the DC/AC converter, stabilising the power flowing to and from the at least one energy storage if available, and stabilising the power flowing to the controllable DC loads which are determined based at least in part on the power controllability and power capacity and functions of each of the number of controllable DC loads.

The set of third level control objectives may include at least in part balancing the power flowing to and from the DC bus and stabilising the voltage on the DC bus.

The method may further comprise continuously controlling the power flowing to the number of controllable DC loads by following a priority order which is determined based at least in part on the power controllability and power capacity and functions of each of the number of controllable DC loads.

The method may further comprise updating the determined power flowing through the DC/AC converter and/or the determined power flowing to and from the at least one energy storage if available each time the balanced power flowing to and from the DC bus are interrupted by at least in part a sizable DC load and/or a DC power source and/or an energy storage connected to or disconnected from the DC bus interruptedly.

The apparatus according to the first aspect may further comprise control system configured to perform the method according to the second aspect.

BRIEF DESCRIPTION OF THE DRAWINGS

For a more complete understanding of the apparatuses and methods described herein, reference is made now to the accompanying drawings, in which.

DETAILED DESCRIPTION

In the description and drawings, like reference numerals may refer to like elements throughout.

Figure 1A:
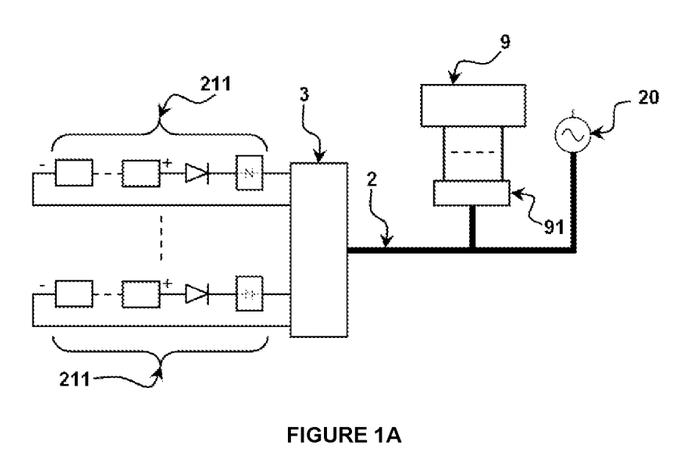
FIG. 1A illustrates an example of directly grid-connected solar photovoltaic power system in a built environment.

FIG. 1A illustrates an example of directly grid-connected solar photovoltaic power system for use in a built environment or embedded solar photovoltaic power system in a built environment. The embedded solar photovoltaic power system comprises a plurality of parallel strings 211 of solar photovoltaic modules, which are connected to an AC bus 2 through a central DC/AC converter 3 or a plurality of parallel DC/AC converters, which make up a central DC/AC converter 3. A plurality of AC loads 9 in the built environment are connected to the AC bus 2 through a switching board 91, and the AC bus 2 is connected to a mains power grid 20. The excess power from the plurality of parallel strings 211 of solar photovoltaic modules is exported to the mains power grid 20 through the DC/AC converter 3 after meeting the power demand from the AC loads 9 in the built environment.

Figure 1B:
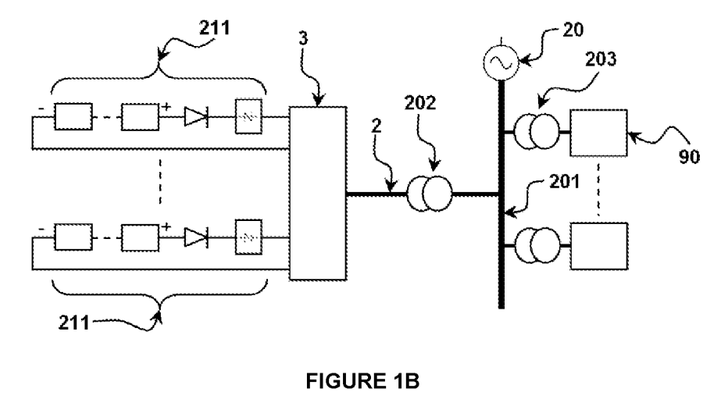
FIG. 1B illustrates an example of directly grid-connected solar photovoltaic power system in a distribution network.

FIG. 1B illustrates an example of distributed solar photovoltaic power system, which is directly connected to a distribution network. The distributed solar photovoltaic power system comprises a plurality of parallel strings 211 of solar photovoltaic modules, which are connected to an AC bus 2 through a central DC/AC converter 3. The AC bus 2 is connected to a distribution network 201 with mains power supply 20. A transformer 202 is generally configured to couple the AC bus 2 and the distribution network 201 if the voltage in the distribution network 201 is higher than the voltage on the AC bus 2. A plurality of AC load centres 90 may be connected to the distribution network 201 directly (not shown) or through transformers 203. The power from the strings 211 of solar photovoltaic modules is exported directly to the distribution network 201 through the central DC/AC converter 3.

Figure 1C:
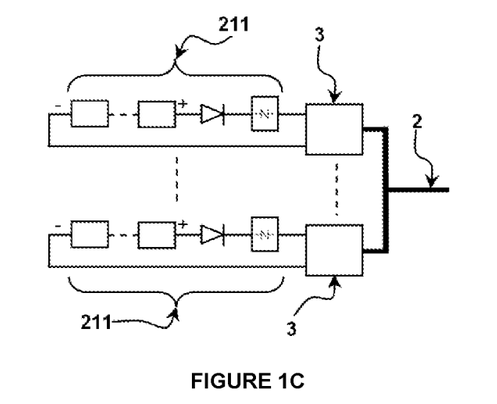
FIGS. 1C and 1D illustrate examples of renewable power systems for use in directly grid-connected renewable power systems of FIGS. 1A and 1B.

FIG. 1C illustrates a second type solar photovoltaic power system which comprises a plurality of parallel strings 211 of solar photovoltaic modules, and each string 211 of solar photovoltaic modules is connected to the AC bus 2 through a string DC/AC converter 3. The solar photovoltaic power system may replace the solar photovoltaic power system illustrated by FIGS. 1A and 1B.

Figure 1D:
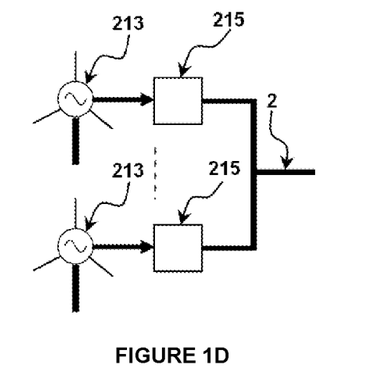

FIG. 1D illustrates an example of wind power system which comprises a plurality of wind turbines 213, and each of the wind turbines 213 is connected to the AC bus 2 through a power electronic converter 215. The wind power system may replace the solar photovoltaic power system illustrated by FIGS. 1A and 1B. The grid connection method may be applied to most wind turbines; however for wind turbines with an induction generator, the power electronic converter 215 may be omitted.

For each of the renewable power systems illustrated by FIGS. 1A to 1D, the power capacity of all the grid connection devices, including the DC/AC converters 3 (as in FIGS. 1A, 1B and 1C) for strings 211 of solar photovoltaic modules and the power electronic converters 215 (as in FIG. 1D) for wind turbines 213, the cables for the AC bus 2 and the transformer 202 coupling the AC bus 2 and the distribution network 201 (as in FIG. 1B), are generally the same as the power capacity of the renewable power system.

For the grid-connected renewable power systems illustrated by FIGS. 1A and 1B, either for use in a built environment (as in FIG. 1A) or for direct connection to a distribution network 201 (as in FIG. 1B), the common problems they face include 1) fluctuated power from the renewable power generators (e.g. wind turbine generators and/or photovoltaic modules) is directly fed to the AC bus 2 and which may have a major impact on the power quality of the mains power grid 20 (as in FIG. 1A) or the distribution network 201 (as in FIG. 1B); 2) power generation from the renewable power generators may not match the power demand from the AC loads 9 in the built environment (as in FIG. 1A) or from the AC load centres 90 connected to the distribution network 201 (as in FIG. 1B), and the mismatch demands for more standby power stations of traditional fuel sources, typically natural gas and diesel; 3) the mains power grid 20 and the distribution network 201 are generally designed for one way power flow, the capability for reverse power flow may be limited; and 4) the grid connection equipment of the directly grid-connected renewable power systems generally have a low power capacity factor, such as about 8~12% for solar photovoltaic power systems and 25~35% for wind power systems.

This specification will hereinafter describe apparatus for use in a microgrid and which may allow the end-users of the microgrid, the electricity grid operator and the public to benefit more than from the directly grid-connected renewable power systems of FIGS. 1A to 1D while avoiding the problems as described above.

Figure 2A:
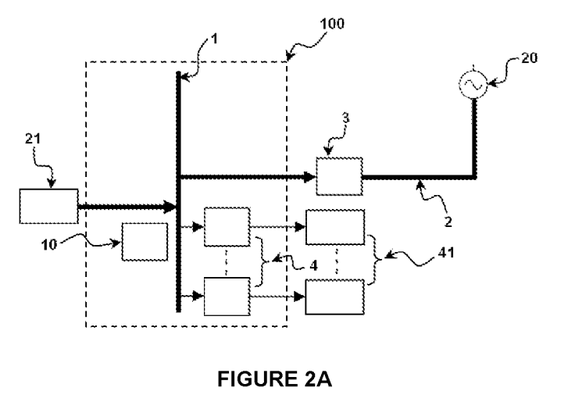
FIGS. 2A and 2B illustrate examples of apparatus for use in microgrids with DC/AC converters for direct grid connection.
Figure 2B:
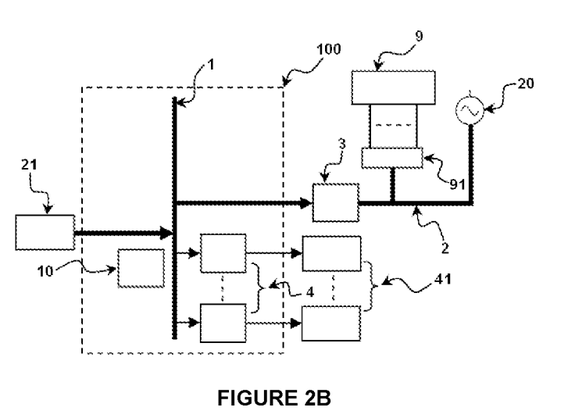

FIGS. 2A and 2B illustrate examples of apparatus 100 for use in microgrids.

As illustrated in FIG. 2A, a microgrid comprises a DC bus 1, at least one DC power source 21 which is configured to connect to the DC bus 1 and feed power from the at least one DC power source 21 to the DC bus 1, an AC bus 2 which is configured to connect the mains power grid 20, a DC/AC converter 3 which is configured to couple the DC bus 1 and the AC bus 2 and feed power from the DC bus 1 to the AC bus 2, and an apparatus 100.

As illustrated by FIG. 2B, a microgrid may comprise number of (at least one) AC loads 9 which are connected to the AC bus 2 through a switch board 91.

It will be appreciated that many different types of DC power sources 21 may be configured to connect to the DC bus 1 in the microgrids of FIGS. 2A and 2B, particularly renewable DC power sources. A renewable DC power source may be, for example, an array of solar photovoltaic modules, a wind turbine generator or wind turbine generators, a hybrid solar photovoltaic and wind power system, but are not limited as such.

Figure 2C:
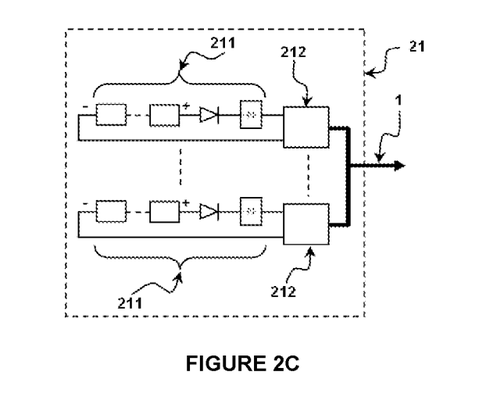
FIGS. 2C and 2D illustrate examples of renewable power systems for use in the microgrids of FIGS. 2A and 2B.
Figure 2D:
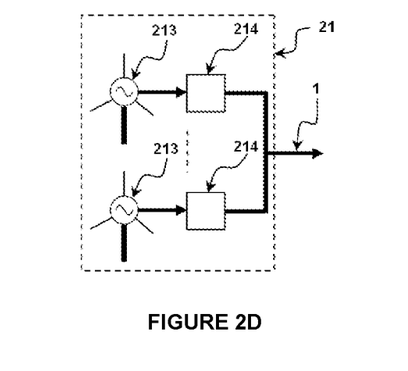

It will be appreciated that there are many different methods to connect a solar photovoltaic power system or a wind power system or a hybrid solar photovoltaic and wind power system to the DC bus 1 in the microgrids of FIGS. 2A and 2B, for example, the methods as illustrated in FIGS. 2C and 2D, but are not limited as such.

As illustrated in FIG. 2C, strings 211 of solar photovoltaic modules may be configured to connect to the DC bus 1 through MPPT (maximum power point tracking) DC/DC converters 212.

As illustrated in FIG. 2D, a wind turbine with synchronous generator 213 may be configured to connect to the DC bus 1 through an AC/DC power converter 214, which is generally configured with an MPPT control algorithm.

As illustrated in FIGS. 2A and 2B, the DC/AC converter 3 may be configured to control the power flowing from the DC bus 1 to the AC bus 2.

As illustrated in FIGS. 2A and 2B, a microgrid may comprise number of (at least one) controllable DC loads 41.

A controllable DC load may have different meanings in different contexts. However in this specification, a controllable DC load refers to the controllability of the power input to the DC load. The controllability of the power input to a DC load refers to the time (e.g. when) to input the power to the DC load and/or the value (e.g. volume) of the power input to the DC load. The power input to a DC load may be controllable in terms of the time (e.g. when to supply the power) and the value (e.g. the power value) while the functions of the DC load are fulfilled.

A controllable DC load 41 may be controlled to serve a power demand response management purpose while the functions of the controllable DC load 41 are fulfilled. In other words, the power flowing to a controllable DC load 41 may be controlled to respond to, for example, the availability of the at least one DC power source 21 or the grid electricity tariff (e.g. cost/kWh) from the mains power grid 20 (as in FIGS. 2A and 2B), while the functions of the controllable DC load 41 are fulfilled or not impacted or not significantly impacted (e.g. when such an impact is allowed), but are not limited as such.

There are many types of controllable DC loads 41, for example, a resistor or a DC motor or an AC motor or even the batteries of an electric vehicle may be a controllable DC load 41, but are not limited as such.

A resistor may be a DC load and may be powered by a DC power source. A resistor may be configured as an electric heater or an immersion heater for heating water or space or other heating purposes. Serving as a heater, a resistor generally has excellent flexibility and controllability in terms of electrical power input while the function (e.g. heating) of the resistor is fulfilled. For example, an electric heater or an immersion heater for space or water heating in a built environment generally has flexibility in terms of the time (e.g. when) to supply the power and the power (e.g. the power value) supplied to the electric heater or immersion heater (e.g. the resistor), and the power is proportional to $V^2$, where V is the voltage applied on the resistor. In other words, the voltage applied on an electric heater or immersion heater for space or water heating in a built environment may be between 0 and its nominal voltage once the total heat volume is provided through a period of time. Hence the voltage applied on a resistor may be controlled through a DC/DC converter while the function of the resistor is fulfilled or not impacted or not significantly impacted.

A DC motor may be a DC load and powered by a DC power source. DC motors have great controllability in terms of speed (e.g. rotational speed) and therefore are widely employed as drivers in electric appliances and machines in built environments. DC motor speed control is through controlling the voltage hence the power applied on the DC motor. In some applications, a DC motor may have flexibility or controllability in terms of the time (e.g. when) to supply the power to the DC motor while the functions of the DC motor are fulfilled. In other applications, a DC motor generally may have flexibility or controllability in terms of the power (e.g. the power value) input to the DC motor while the functions of the DC motor are fulfilled. For example, the compressor of a heat pump may be driven by a DC motor. By varying the voltage applied on the DC motor, the speed of the DC motor and hence the speed of the compressor changes. In addition, since the power is proportional to the speed, the power input to the DC motor and to the compressor of the heat pump also changes. Heat pumps are widely used for heating, cooling and refrigeration purpose. A heat pump generally has great flexibility or controllability in terms of the time (e.g. when) to supply the power and the power (e.g. the power value) supplied to the heat pump. Hence the voltage applied on the DC motor may be controlled between a pair of bottom and top values through a DC/DC converter while the functions of the DC motor (e.g. the functions of the compressor and the heat pump) are fulfilled or not impacted or not significantly impacted. The fans and pumps in air conditioning and ventilation systems may be also driven by DC motors, which may be powered by DC power sources through DC/DC converters and have flexibility or controllability in terms of the time (e.g. when) to supply the power and the power (e.g. the power value) supplied to the DC motors.

An induction motor (e.g. AC motor) may be a DC load and powered by a DC power source through a DC/AC inverter. Induction motors are widely used as drivers in electric appliances and machines in built environment and are largely powered by frequency inverters. A frequency inverter is a back-to-back power converter comprising an AC/DC converter and a DC/AC inverter. Induction motor speed control is through controlling the frequency of the AC power applied on the induction motor, and the power input to the induction motor is generally proportional to the speed of the induction motor and hence the frequency of the AC power applied on the induction motor. This is true when the load torque applied on the rotor shaft of the induction motor is constant, which is the case in most applications. In some applications, an induction motor may have flexibility or controllability in terms of the time (e.g. when) to supply the power to the induction motor and the power (e.g. the power value) input to the induction motor while the functions of the induction motor are fulfilled. For example, the compressor of a heat pump may be driven by an induction motor, which may be powered by an AC power source (e.g. mains power supply) through a back-to-back power converter, which includes a grid-side AC/DC converter and a machine side DC/AC inverter which serve as the frequency inverter. When a DC power source is available, the grid side AC/DC converter may be omitted and a DC/AC inverter may be employed to serve as the frequency inverter to power the induction motor. In other words, an induction motor may be a DC load and powered by a DC power source through a DC/AC frequency inverter. By varying the frequency of the AC power output from the DC/AC frequency inverter, both the speed of and the power input to the induction motor may be controlled. Hence for a heat pump compressor driven by an induction motor, the frequency and hence the power applied on the induction motor may be controlled between a pair of bottom and top values through a DC/AC frequency inverter while the functions of the AC motor (e.g. the functions of the compressor and the heat pump) are fulfilled or not impacted or not significantly impacted. Similar to the analysis for DC motors, the fans and pumps in air conditioning and ventilation systems may be also driven by induction motors, which may be powered by DC power sources through DC/AC frequency inverters and have great flexibility or controllability in terms of the time (e.g. when) to supply the power and the power (e.g. the power value) supplied to the induction motors.

The batteries of an electric vehicle, EV, may be charged by a DC power source through a DC EV charger. In other words, the EV batteries may be configured as a DC load when the EV is connected to a DC EV charger, which is powered by a DC power source, for charging. It is an industrial practice that the charging power (e.g. the charging current) to the EV batteries is controlled and variable and which is referred as fast charging with high charging power (e.g. high charging current) or slow changing with low charging power (e.g. low charging current). Charging the batteries of an electric vehicle generally has excellent flexibility and controllability in terms of the charging power (e.g. the charging current) whiles the charging a specific amount of electricity (in the unit of kWh) to the EV batteries is completed in a defined period of time. Hence the EV batteries may be configured as a controllable DC load by controlling the charging current to the EV batteries through a DC EV charger. In other words, the charging power (e.g. charging current) flowing to the EV batteries may be between 0 and its nominal value of the DC EV charger once the specific amount of electricity is charged to the EV batteries in a defined period of time.

As illustrated in FIGS. 2A and 2B, the apparatus 100 comprises number of (at least one) DC power converters 4 and a control system 10. Each of the number of DC power converters 4 is configured to couple a respective controllable DC load 41 and the DC bus 1, and the control system is configured to control the power flowing from the DC bus 1 to each of the number controllable DC loads 41 through the respective coupling DC power converter 4 to fulfil its functions.

A resistor may be a controllable DC load 41, which may be configured to connect to the DC bus 1 through a specific DC power converter 4. The specific DC power converter 4 may be configured as a DC/DC converter, and the DC/DC converter may be configured to control the power flowing from the DC bus 1 to the controllable DC load 41 (e.g. the resistor) to fulfil its functions (e.g. as an electric heater).

A DC motor may be a controllable DC load 41, which may be configured to connect to the DC bus 1 through a specific DC power converter 4. The specific DC power converter 4 may be configured as a DC/DC converter, and the DC/DC converter may be configured to control the power flowing from the DC bus 1 to the controllable DC load 41 (e.g. the DC motor) to fulfil its functions (e.g. as a variable speed driver).

An AC motor (e.g. induction motor) may be a controllable DC load 41, which may be configured to connect to the DC bus 1 through a specific DC power converter 4. The specific DC power converter 4 may be configured as a DC/AC frequency inverter, and the DC/AC frequency inverter may be configured to control the power flowing from the DC bus 1 to the controllable DC load 41 (e.g. the AC motor) to fulfil its functions (e.g. as a variable speed driver).

The batteries of an electric vehicle, EV, may be a controllable DC load 41, which may be configured to connect to the DC bus 1 through a specific DC power converter 4. The specific DC power converter 4 may be configured as a DC/DC charging converter (e.g. a DC EV charger), and the DC EV charger may be configured to control the power flowing from the DC bus 1 to the controllable DC load 41 (e.g. the EV batteries) to fulfil its functions (e.g. to charge the EV batteries).

As illustrated in FIGS. 2A and 2B, the control system 10 is configured to control each of the number of DC power converters 4. The control system 10 is configured to control each of the number of DC power converters 4 to control the voltage on the DC bus 1 through balancing the power flowing to and from the DC bus 1 by controlling the power flowing from the DC bus 1 to the respective controllable DC load 41 if the respective controllable DC load 41 has sufficient power capacity to do so.

For example, the microgrid as illustrated in FIG. 2A may be used for a domestic property, and there may be only one immersion heater as the controllable DC load 41 connected to the DC bus 1 through a DC/DC converter as the respective DC power converter 4, the DC power source 21 may be a string or two strings of solar photovoltaic modules, but are not limited as such. The immersion heater has a fixed (e.g. defined) power rating (e.g. power capacity) and the maximum power it may take from the solar photovoltaic modules may be higher than the amplitude of the power output fluctuation from the solar photovoltaic modules for a specific time period. In this circumstance, the immersion heater may be configured to control the voltage on the DC bus 1 through controlling the power flowing from the DC bus 1 to the immersion heater so that the power flowing from the solar photovoltaic modules is balanced by the power flowing to the immersion heater and the scheduled power flowing (described in the control method) to the AC bus through the DC/AC converter 3.

As illustrated in FIGS. 2A and 2B, a specific controllable DC load 41 along with its coupling DC power converter 4 may not have sufficient controllable power capacity to balance the power flowing to and from the DC bus 1 and control the voltage on the DC bus 1. However some or all of the number of controllable DC loads 41 may have sufficient power capacity to do so, and the control system 10 may be configured to control the voltage on the DC bus 1 through balancing the power flowing to and from the DC bus 1 by coordinative controlling the power flowing to some or all of the number of controllable DC loads 41 through the respective coupling DC power converters 4.

For example, the microgrid as illustrated in FIG. 2A may be used for a building, and there may be one immersion heater and one electric vehicle, EV, as two controllable DC loads 41 connected to the DC bus 1 through one DC/DC converter (for the immersion heater) and one DC EV charger (for the EV batteries) as the respective DC power converters 4, the DC power source 21 may be a plurality strings 211 of solar photovoltaic modules (as in FIG. 2C), but are not limited as such. The immersion heater may not have sufficient controllable power capacity to balance the power fluctuation from the plurality strings 211 of solar photovoltaic modules, however together with the EV batteries, the two controllable DC loads 41 may have sufficient power capacity to do so. In this circumstance, a priority order based on the power controllability and capacity and functions of each of the two controllable DC loads 41 may be determined to prioritise the controlling order and/or pattern for the power flowing to the immersion heater and the EV batteries. Hence the control system 10 may be configured to control the voltage on the DC bus 1 through balancing the power flowing to and from the DC bus 1 by coordinative controlling of the power flowing to the immersion heater through the DC/DC converter and the power flowing to the EV batteries through the DC EV charger.

It will be appreciated that any appropriate priority controlling order and/or pattern may be used for the coordinative controlling of the power flowing to the some or all of the number of controllable DC loads 41 through the respective coupling DC power converters 4.

It will be appreciated that, in the microgrids of FIGS. 2A and 2B, a low voltage DC network (not shown) with low voltage batteries and low voltage DC loads connected thereto may be considered as a controllable DC load 41 and configured to connect to the DC bus 1 through a DC power converter 4 (e.g. a DC/DC converter) (not shown). The low voltage DC loads may be, for example, computers, laptops and multimedia devices, but are not limited as such. The low voltage DC loads may be configured to connect to the low voltage DC network directly or indirectly through low voltage DC power converters.

As illustrated in FIGS. 2A and 2B, the number controllable DC loads 41 along with the respective coupling DC power converters 4 may not have sufficient controllable power capacity to balance the power flowing to and from the DC bus 1 and control the voltage on the DC bus 1. The DC/AC converter 3 may be configured to receive external control signals to control the power flowing from the DC bus 1 to the AC bus 2. For example, the DC/AC converter 3 may be configured to receive control signals (e.g. power flowing from the DC bus 1 to the AC bus 2) from the control system 10, but are not limited as such. Hence the control system 10 may be configured to control the voltage on the DC bus 1 through balancing the power flowing to and from the DC bus 1 by coordinative controlling of the power flowing to the number controllable DC loads 41 through the respective coupling DC power converters 4 and the power flowing from the DC bus 1 to the AC bus 2 through the DC/AC converter 3.

It will be appreciated that, when the DC/AC converter 3 participates in balancing the power flowing to and from the DC bus 1, it will introduce fluctuation of the power output from the microgrid to the mains power grid 20. In other words, the power flowing from the DC bus 1 to the AC bus 2 will fluctuate and will be no longer under control. In this circumstance, battery storage may be introduced to dump the power fluctuation to the mains power grid 20.

Figure 3A:
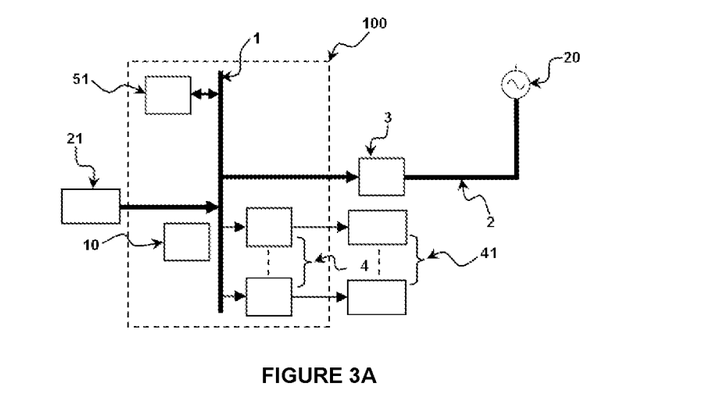
FIGS. 3A and 4A illustrate examples of battery storage for use in the apparatus of FIGS. 2A and 2B.
Figure 3B:
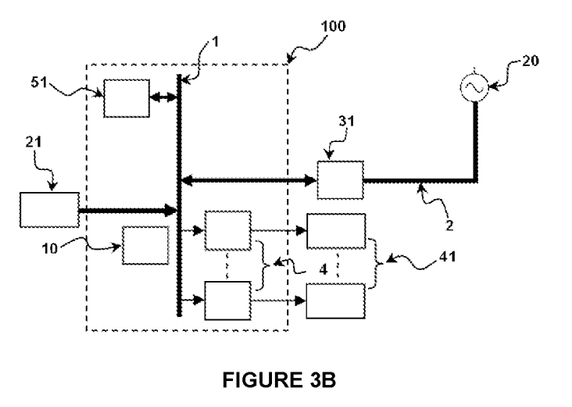
FIGS. 3B and 4B illustrate examples of battery storage for use in the apparatus for use in microgrids with bidirectional DC/AC converters.

As illustrated in FIGS. 3A and 3B, the apparatus 100 may further comprise at least one battery storage 51 which may be configured to connect to the DC bus 1 directly.

As illustrated in FIG. 3A, the DC/AC converter 3 in the microgrid is a DC/AC inverter (e.g. power flows only from the DC bus 1 to the AC bus 2). Charging the battery storage 51 only takes place when the at least one DC power source 21 generates power and the voltage on the DC bus 1 is higher than the open-circuit battery terminal voltage of the battery storage 51. Discharging the battery storage 51 takes place when the voltage on the DC bus 1 is lower than the open-circuit battery terminal voltage of the battery storage 51.

As illustrated in FIG. 3B, a microgrid may comprise a bidirectional DC/AC converter 31, which is configured to operate in both inverting mode (e.g. DC power to AC power conversion) and rectifying mode (e.g. AC power to DC power conversion). Charging the battery storage 51 takes place when the voltage on the DC bus 1 is higher than the open-circuit battery terminal voltage of the battery storage 51 and the power may come from the at least one DC power source 21 and/or the mains power grid 20 through the bidirectional DC/AC converter 31 when it operate as a rectifier. Discharging the battery storage 51 takes place when the voltage on the DC bus 1 is lower than the open-circuit battery terminal voltage of the battery storage 51.

Figure 4A:
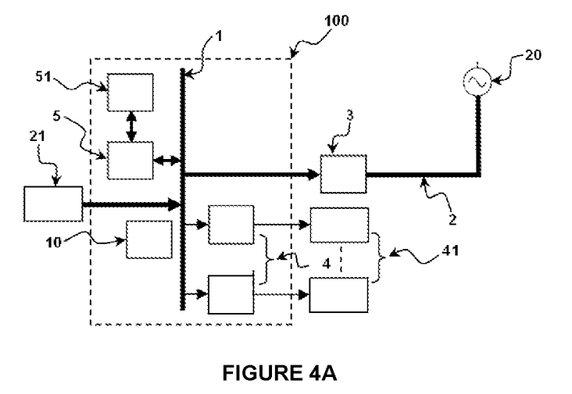
Figure 4B:
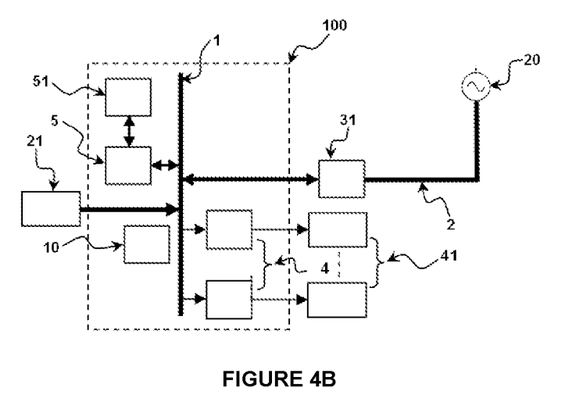

As illustrated in FIGS. 4A and 4B, the apparatus 100 may further comprise at least one bidirectional DC/DC battery charger 5 which may be configured as a bidirectional DC/DC converter to couple the battery storage 51 and the DC bus 1, and to control the charging and discharging of the battery storage 51. The control system 10 may be configured to control the at least one bidirectional DC/DC battery charger 5.

As illustrated in FIG. 4A, the DC/AC converter 3 in the microgrid may be a DC/AC inverter, which is similar to the DC/AC converter 3 of FIG. 3A.

As illustrated in FIG. 4B, a microgrid may comprise a bidirectional DC/AC converter 31, which is similar to the bidirectional DC/AC converter 31 of FIG. 3B.

With a bidirectional DC/AC converter 31 (as in FIGS. 3B and 4B), the control system 10 may be configured to control the power flowing from the AC bus 2 to the DC bus 1 to charge the at least one battery storage 51 and meet the power demand from the number controllable DC loads 41 and other DC loads connected to the DC bus 1.

It will be appreciated that the bidirectional DC/AC converter 31 of FIGS. 3B and 4B may be implemented as a DC/AC inverter and an AC/DC converter, and the DC/AC inverter and AC/DC converter may be interlocked through a pair of interlock switches (not shown).

As illustrated in FIGS. 3A, 3B, 4A and 4B, the at least one battery storage 51 has excellent controllability for charging and discharging power through controlling the charging and discharging current. The at least one battery storage 51 may be configured to be charged (e.g. power flowing from the DC bus 1 to the battery storage 51) or discharged (e.g. power flowing from the battery storage 51 to the DC bus 1), and charging and discharging the at least one battery storage 51 may be configured to balance the power flowing to and from the DC bus 1 and control the voltage on the DC bus 1. The at least one bidirectional DC/DC battery charger 5 may be configured to control the charging and discharging the battery storage 51 (as in FIGS. 4A and 4B), or charging and discharging the at least one battery storage 51 may be controlled through the voltage control of DC bus 1 (as in FIGS. 3A and 3B). In other words, the control system 10 may be configured to control the voltage on the DC bus 1 through balancing the power flowing to and from the DC bus 1 by controlling the power flowing to and from the at least one battery storage 51.

The control system 10 may be configured to control the voltage on the DC bus 1 through balancing the power flowing to and from the DC bus 1 by coordinative controlling the power flowing to the number controllable DC loads 41 through the respective coupling DC power converters 4, as described above with reference to FIGS. 2A and 2B.

As illustrated in FIGS. 3A, 3B, 4A and 4B, with the at least one battery storage 51, the coordinative controlling and balancing of the power flowing to and from the DC bus 1 may further include the power flowing to and from the at least one battery storage 51. In other words, the control system 10 may be configured to control the voltage on the DC bus 1 through balancing the power flowing to and from the DC bus 1 by coordinative controlling of the power flowing to and from the at least one battery storage 51 and the power flowing to the number controllable DC loads 41 through the respective coupling DC power converters 4.

It will be appreciated that, the control system 10 may be configured to control the voltage on the DC bus 1 through balancing the power flowing to and from the DC bus 1 by controlling the power flowing to and from just the at least one battery storage 51. However, with the availability of the number controllable DC loads 41, the capacity of the at least one battery storage 51 may be significantly reduced. In other words, the cost of the apparatus 100, and hence the cost of the microgrid, may be significantly reduced.

When the at least one battery storage 51 is connected to the DC bus 1 directly, as illustrated in FIGS. 3A and 3B, controlling the power flowing to and from the at least one battery storage 51 is through the voltage control on the DC bus 1. When the at least one battery storage 51 is connected to the DC bus 1 through a specific bidirectional DC/DC battery charger 5, as illustrated in FIGS. 4A and 4B, controlling the power flowing to and from the at least one battery storage 51 is through the specific bidirectional DC/DC battery charger 5.

It will be appreciated that connecting the at least one battery storage 51 to the DC bus 1 directly may be a very economical solution because it saves the cost of the specific bidirectional DC/DC battery charger 5, and may have very high power conversion efficiency for the at least one battery storage 51 because there is no power conversion loss by the specific bidirectional DC/DC battery charger 5.

It will be appreciated that the control system 10 may be more complicated for apparatus 100 of FIGS. 3A and 3B than apparatus 100 of FIGS. 4A and 4B.

The control system 10 may be configured to control the voltage on the DC bus 1 through balancing the power flowing to and from the DC bus 1 by coordinative controlling of the power flowing to the number controllable DC loads 41 through the respective coupling DC power converters 4 and the power flowing from the DC bus 1 to the AC bus 2 through the DC/AC converter 3, as described above with reference to FIGS. 2A and 2B.

As illustrated in FIGS. 3A and 4A, with the at least one battery storage 51, the coordinative controlling and balancing of the power flowing to and from the DC bus 1 may further include power flowing to the AC bus 2 through the DC/AC converter 3.

As illustrated in FIGS. 3B and 4B, with the at least one battery storage 51, the coordinative controlling and balancing of the power flowing to and from the DC bus 1 may further include power flowing to and from the AC bus 2 through the bidirectional DC/AC converter 31.

As illustrated in FIGS. 3A, 3B, 4A and 4B, with the at least one battery storage 51, hence the control system 10 may be configured to control the voltage on the DC bus 1 through balancing the power flowing to and from the DC bus 1 by coordinative controlling of the power flowing to and from the at least one battery storage 51, the power flowing to the number controllable DC loads 41 through the respective coupling DC power converters 4 and the power flowing to the AC bus 2 through the DC/AC converter 3 (as in FIGS. 3A and 4A) or the power flowing to and from the AC bus 2 through the bidirectional DC/AC converter 31 (as in FIGS. 3*b* and 4B).

It will be appreciated that, in some applications, the apparatus 100 may have to limit the capacity of the at least one battery storage 51 and hence the system cost. In this circumstance, the DC/AC converter 3 may be configured to participate in balancing the power flowing to and from the DC bus 1, even though it will introduce fluctuation of the power output from the microgrid to the mains power grid 20. It is worth mentioning, the fluctuation of the power output from the microgrid to the mains power grid 20 is generally much better controlled than the fluctuation of the power output from a directly grid-connected solar photovoltaic power system to the mains power grid 20 (as in FIGS. 1A and 1B).

The batteries of an electric vehicle, EV, may be configured as a plug-and-play battery storage to provide support to the microgrids of FIGS. 2A, 2B, 3A, 3B, 4A and 4B. The at least one battery storage 51 in FIGS. 4A and 4B may be replaced with the EV batteries, and the at least one bidirectional DC/DC battery charger 5 may be configured as a smart bidirectional DC/DC EV charger (e.g. a smart EV charger). For example, a smart EV charger (5) along with the EV batteries (51) may be configured to provide frequency support to the mains power grid 20, voltage support to the DC bus 1 (e.g. participating in balancing the power flowing to and from the DC bus 1 by controlling the power flowing to and from the EV batteries), and power support to the mains power grid 20 (e.g. discharging the EV batteries to feed to the mains power grid 20 through the DC/AC converter 3), but are not limited as such.

It will be appreciated that the at least one battery storage 51 in FIGS. 4A and 4B may be replaced with any other type of energy storage, and the coupling bidirectional DC/DC battery charger 5 may be replaced with another type of bidirectional energy storage charger or charging controller accordingly. For example, a flywheel and an associated power converter may be configured to replace the at least one battery storage 51 and the coupling bidirectional DC/DC battery charger 5, a pumped storage and an associated power converter may be configured to replace the at least one battery storage 51 and the coupling bidirectional DC/DC battery charger 5, but are not limited as such.

In a built environment there may be some power loads which may be powered by a DC power source but may be uncontrollable in terms of power supply (e.g. time and value of the power supply), for example, computers without embedded batteries, lights, multimedia and entertainment devices without embedded batteries, but are not limited as such.

It will be appreciated that, in the microgrids of FIGS. 2A, 2B, 3A, 3B, 4A and 4B, an uncontrollable DC load (not shown) may be configured to connect to the DC bus 1 directly or indirectly through a specific DC power converter (not shown), and the uncontrollable DC load may be configured with an on/off switch. For example, a light or a group of lights in series and/or in parallel may be considered as an uncontrollable DC load and configured to connect to the DC bus 1 directly or indirectly through a specific DC/DC converter, a computer may be considered as an uncontrollable DC load and configured to connect to the DC bus 1 through a specific DC/DC converter, but are not limited as such.

The various operations performed by the control system 10 of the apparatus 100 for use in a microgrid of FIGS. 2A, 2B, 3A, 3B, 4A and 4B will now be described in more detail with reference to FIGS. 5A to 5E.

Figure 5A:
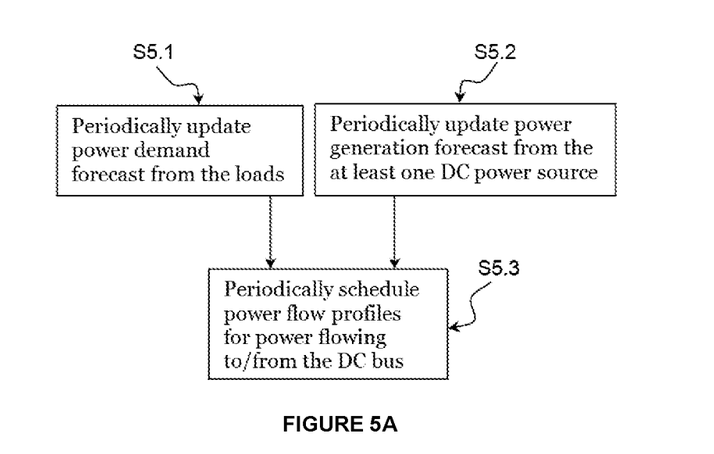
FIGS. 5A to 5D illustrate examples of various control methods that may be performed by the control system of an apparatus for use in a microgrid.

As illustrated in FIG. 5A, the control system 10 is configured to update power demand forecast from the loads (S5.1) in the microgrid, including both the AC loads 9 connected to the AC bus 2 and the DC loads connected to the DC bus 1, in which the DC loads include all the number controllable DC loads 41 and all the uncontrollable DC loads connected to the DC bus 1. The control system 10 is configured to update power generation forecast from the at least one DC power source 21 (S5.2), which may be, for example, strings 211 of solar photovoltaic modules coupled with MPPT DC/DC converters 212 (as in FIG. 2C) and/or wind turbine generators 213 coupled with AC/DC power converters 214 (as in FIG. 2D), but are not limited as such. Any appropriate method for the power demand forecast from the loads (S5.1) and the power generation forecast from the at least one DC power source 21 (S5.2) may be used.

The control system 10 is further configured to schedule power flow profiles for the power flowing to and from the DC bus 1 (S5.3), including the power flowing to and from the at least one energy storage 51 (as in FIGS. 3A, 3B, 4A and 4B), the power flowing to the number controllable DC loads 41 (as in FIGS. 2A, 2B, 3A, 3B, 4A and 4B), and the power flowing through the DC/AC converter 3 (as in FIGS. 2A, 2B, 3A and 4A) or the bidirectional DC/AC converter 31 (as in FIGS. 3B and 4B). The power flow profiles scheduling module (S5.3) is based at least in part on the power generation forecast from the at least one DC power source 21 (S5.2) and the power demand forecast from the loads (S5.1).

Figure 5B:
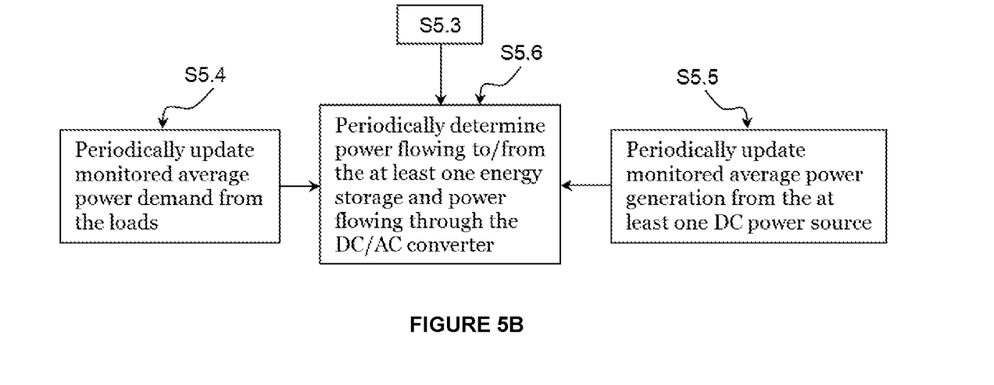
Figure 5C:
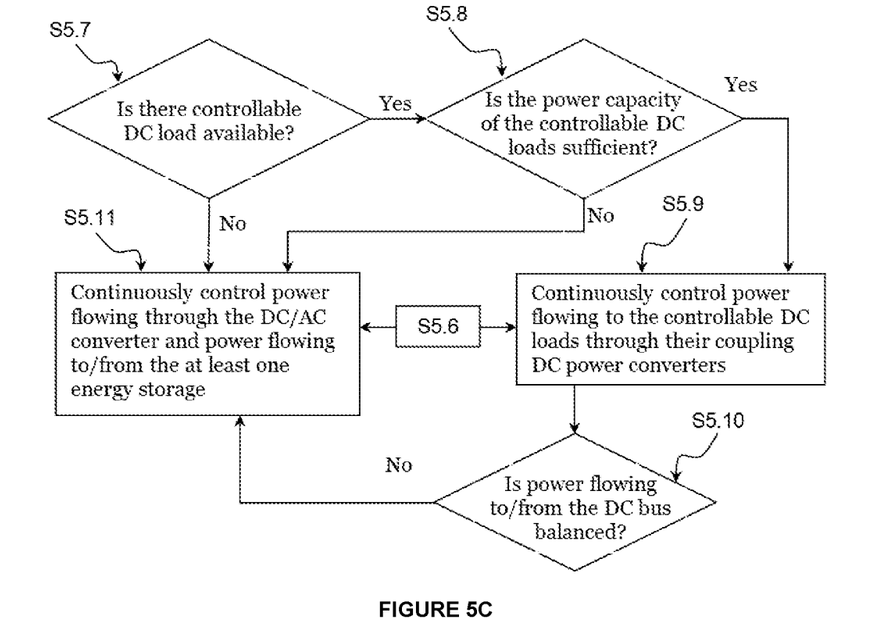
Figure 5D:
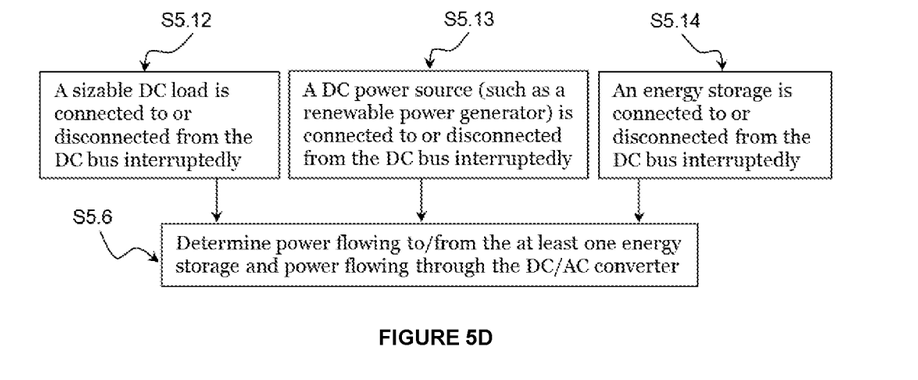
Figure 5E:
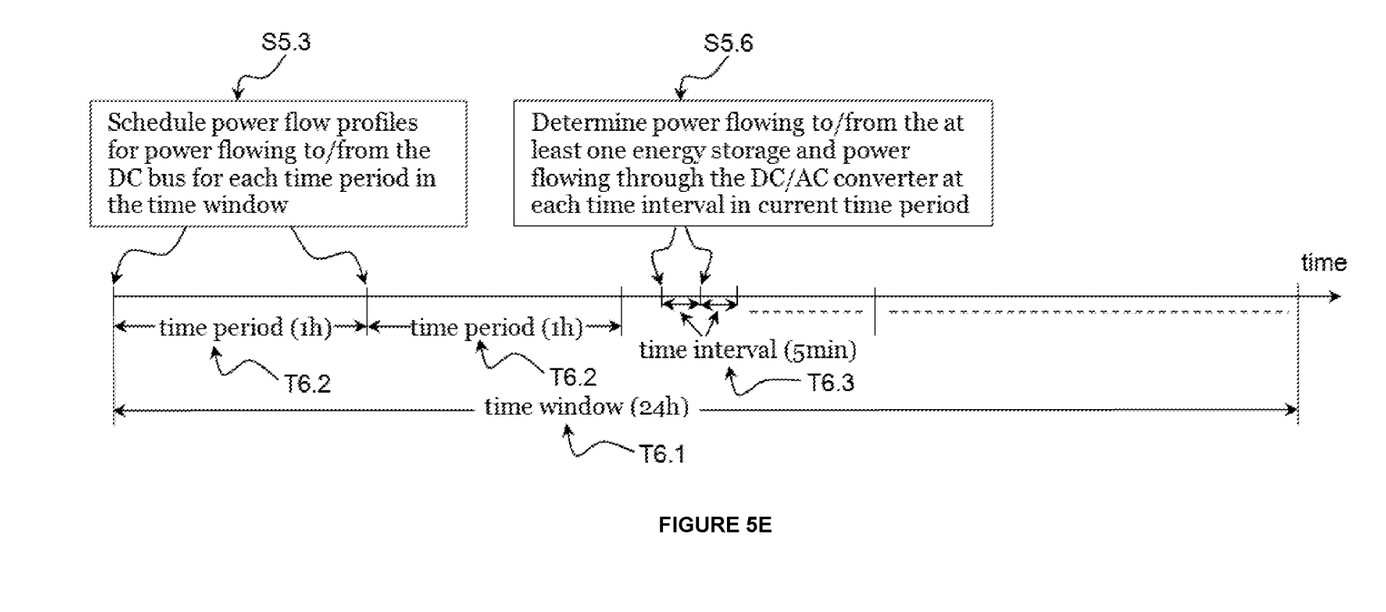
FIG. 5E illustrates examples of time intervals within a time period and examples of time periods within a time window.

The functions of the three modules (S5.1, S5.2 and S5.3) illustrated by FIG. 5A are repeated periodically at least two successive time periods T6.2, which may be, for example, on an hourly basis or every two hours basis or every three hours basis, but are not limited as such, for a defined time window T6.1, which may be, for example, 24 hours, but is not limited as such, as illustrated in FIG. 5E.

The scheduling of the power flow profiles (S5.3) may be further based on a set of one or more objectives. The objectives of scheduling the power flow profiles (S5.3) may include, for example, to maximise self-consumption of the power generation from the at least one DC power source 21 by the loads in the microgrid; to minimise reverse power flowing from the microgrid to the mains power grid 20; to maximise financial benefits for the end-users of the microgrid; and to minimise power drawn from the mains power grid 20 to the microgrid at high (peak) electricity tariff hours, but are not limited as such. The power flow profiles for the power flowing to and from the DC bus 1 may be scheduled based on, for example, the mains power grid electricity tariff, time-of-use tariff, feed-in-tariff and export to mains power grid tariff for renewable power generation, the operation cost and technical information of the at least one energy storage 51, but are not limited as such. Any appropriate scheduling optimization algorithm for scheduling the power flow profiles (S5.3) may be used.

The control methods illustrated by FIG. 5A also help to extend the life span of the at least one battery storage 51, through scheduling measures configured in the power flow profiles scheduling module (S5.3), and which may be, for example, through slow charging and discharging the at least one battery storage 51, and avoiding over charging and dead discharging the at least one energy storage 51 (e.g. battery storage), but are not limited as such.

As illustrated in FIG. 5B, the control system 10 is configured to update the monitored average power demand from the loads (S5.4), including both the AC loads 9 connected to the AC bus 2 and all the DC loads connected to the DC bus 1, and the monitored average power generation from the at least one DC power source 21 (S5.5), for a previous time interval T6.3 (as in FIG. 5E).

The control system 10 is further configured to determine the power flowing to and from the at least one energy storage 51 and the power flowing through the DC/AC converter 3 (as in FIGS. 2A, 2B, 3A and 4A) or the bidirectional DC/AC converter 31 (as in FIGS. 3B and 4B) (S5.6) periodically for at least two successive time intervals T6.3, which may be, for example, every 5 minutes or every 10 minutes, but are not limited as such, within a present time period T6.2, as illustrated in FIG. 5E. The determining power flows module (S5.6) is based at least in part on the scheduled power flow profiles (S5.3) for the present time period T6.2 and the monitored average power demand from the loads (S5.4) and the monitored average power generation from the at least one DC power source 21 (S5.5) for the previous time interval T6.3. The functions of the three modules (S5.4, S5.5 and S5.6) illustrated by FIG. 5B are repeated for at least two successive time intervals for the present time period T6.2.

The determining of the power flows (S5.6) may be further based on a set of one or more objectives. The objectives of determining the power flows (S5.6) may include, for example, to stabilise the power flowing to and from the at least one battery storage 51 which helps to extend the life span of the at least one battery storage 51 due to stabilised power flowing to and from the at least one energy storage 51; to stabilise the power flowing through the DC/AC converter 3 (as in FIGS. 2A, 2B, 3A and 4A) or the bidirectional DC/AC converter 31 (as in FIGS. 3B and 4B) which provides high quality power flowing from the DC bus 1 to the AC bus 2 and hence to the mains power grid 20; and to stabilise the power flowing to the number controllable DC loads 41 which is determined based at least in part on the power controllability and power capacity and functions of each of the number controllable DC loads 41.

As illustrated in FIG. 5C, the control system 10 is configured to continuously control the power flowing to the number controllable DC loads 41 (S5.9) in order to balance the power flowing to and from the DC bus 1 and control the voltage on the DC bus 1 in the microgrid, based at least in part on the determined power flowing to and from the at least one energy storage 51 and the determined power flowing through the DC/AC converter 3 (as in FIGS. 2A, 2B, 3A and 4A) or the bidirectional DC/AC converter 31 (as in FIGS. 3B and 4B) (S5.6) for a present time interval T6.3, when there is at least one controllable DC load 41 connected to the DC bus 1 (S5.7) and when there is a power demand from the controllable DC load 41 (S5.8).

The control system 10 may be configured to prioritise the order for the number controllable DC loads 41 to be called by the continuous power flow control module (S5.9) as described above with reference to FIG. 5C when there are at least two controllable DC loads 41 are available for the continuous power flow control purpose, based at least in part on the controllability of each of the number controllable DC loads 41 according to, for example, its power capacity and functions, but are not limited as such. For example, an immersion heater for use in hot water storage generally has excellent controllability, and therefore may be called with a highest priority when an immersion heat is available as a controllable DC load 41, followed by other electric heaters and then the heat pumps and then the batteries of electric vehicles if available. Any coordinative/intelligent control algorithm based at least in part on computational/artificial intelligence may be used for prioritising the order for the number controllable DC loads 41 to be called by the continuous power flow control module (S5.9).

As illustrated in FIG. 5C, the control system 10 is further configured to continuously control the power flowing through the DC/AC converter 3 (as in FIGS. 2A, 2B, 3A and 4A) or the bidirectional DC/AC converter 31 (as in FIGS. 3B and 4B) and the power flowing to and from the at least one energy storage 51 (S5.11), in order to balance the power flowing to and from the DC bus 1 and control the voltage on the DC bus 1 in the microgrid, based at least in part on the determined power flowing to and from the at least one energy storage 51 and the determined power flowing through the DC/AC converter 3 (as in FIGS. 2A, 2B, 3A and 4A) or the bidirectional DC/AC converter 31 (as in FIGS. 3B and 4B) (S5.6) for a present time interval T6.3, when there are no controllable DC load 41 available (S5.7) or when the power capacity of the number controllable DC loads 41 is insufficient to balance the power flowing to and from the DC bus 1 and control the voltage on the DC bus 1 (S5.8).

For example, there may be no heat demand for an immersion heater (as a controllable DC load 41) when the water temperature in the hot water cylinder reaches its top limit, or when the immersion heater is too small and does not have sufficient power capacity to balance the power flowing to and from the DC bus 1 (S5.10) with the determined and stabilised power flowing to and from the at least one energy storage 51 and the determined and stabilised power flowing through the DC/AC converter 3 (as in FIGS. 2A, 2B, 3A and 4A) or the bidirectional DC/AC converter 31 (as in FIGS. 3B and 4B) (S5.6), for any defined time interval T6.3, but are not limited as such. For example, the power capacity of an immersion heater may be lower than the fluctuating amplitude of the power output from a DC power source 21 (such as a solar photovoltaic power system), but is not limited as such. In this situation, the continuous power flow control module (S5.11) may be called alone or called together with the continuous power flow control module (S5.9) in order to balance the power flowing to and from the DC bus 1 and control the voltage on the DC bus 1. Any coordinative/intelligent control algorithm based at least in part on computational/artificial intelligence may be used for the continuous power flow control modules (S5.9) and (S5.11).

As illustrated in FIG. 5D, the control system 10 may be configured to update the determined power flowing to and from the at least one energy storage 51 and the determined power flowing through the DC/AC converter 3 (as in FIGS. 2A, 2B, 3A and 4A) or the bidirectional DC/AC converter 31 (as in FIGS. 3B and 4B) (S5.6) when the balanced power flowing to and from the DC bus 1 is interrupted by, for example, a sizable DC load (S5.12) or a DC power source (such as a renewable power generator) (S5.13) or an energy storage (S5.14), but are not limited as such, that is connected to or disconnected from the DC bus 1 interruptedly. In other words, the control system 10 may be configured to re-determine the power flowing to and from the at least one energy storage 51 and the power flowing through the DC/AC converter 3 (as in FIGS. 2A, 2B, 3A and 4A) or the bidirectional DC/AC converter 31 (S5.6) and then carry on the continuous control of power flowing to the number controllable DC loads 41 (S5.9) and the power flowing through the DC/AC converter 3 (as in FIGS. 2A, 2B, 3A and 4A) or the bidirectional DC/AC converter 31 and the at least one energy storage 51 (S5.11).

A sizable DC load may be a controllable or uncontrollable DC load and may have considerable power capacity. When a sizable DC load or a DC power source (such as a renewable power generator) or an energy storage is connected to or disconnected from the DC bus 1 interruptedly or suddenly, the power flowing to and from the DC bus 1 may not be kept in balance under the continuous control of the power flowing to the number controllable DC loads 41 (S5.9) with the determined and stabilised power flowing to and from the at least one energy storage 51 and the determined and stabilised power flowing through the DC/AC converter 3 (as in FIGS. 2A, 2B, 3A and 4A) or the bidirectional DC/AC converter 31 (as in FIGS. 3B and 4B) (S5.6), and the voltage on the DC bus 1 may become unstable. Under this circumstance, the determining power flows module (S5.6) may be re-called.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus for use in a microgrid, the microgrid comprising a DC bus with at least one DC power source connected thereto, an AC bus connected to a power grid that supplies the microgrid, and a DC/AC converter coupling the DC bus and the AC bus, the apparatus comprising:
   a control system configured:
   to control n DC power converters, n being a positive integer number at least n=1, each of the DC power converters is configured to couple a respective controllable DC load to the DC bus through the power converter; and
   to control power flowing from the DC bus to each of n controllable DC loads, so as to:
   control each of the n controllable DC loads to fulfil its function; and
   stabilize a voltage on the DC bus.

2. The apparatus of claim 1, wherein the control system is configured to control the voltage on the DC bus through balancing the power flowing to and from the DC bus by coordinative controlling of:
   power flowing to at least two controllable DC loads or the n controllable DC loads through respective coupling DC power converters; and/or
   power flowing through the DC/AC converter.

3. The apparatus of claim 1, wherein the apparatus further comprises at least one battery storage configured to connect to the DC bus and/or at least one bidirectional energy storage charger configured to couple a specific energy storage and the DC bus and to control a charging and discharging of the specific energy storage.

4. The apparatus of claim 3, wherein the control system is configured to control the voltage on the DC bus through balancing the power flowing to and from the DC bus by coordinative controlling of the power flowing to and from the at least one battery storage and/or power flowing to and from at least one energy storage through a coupling bidirectional energy storage charger and/or the power flowing to at least two controllable DC loads or the n controllable DC loads through respective coupling DC power converters and/or power flowing through the DC/AC converter.

5. The apparatus of claim 3, wherein the at least one energy storage is configured to be a battery storage, and the at least one bidirectional energy storage charger is configured to be a bidirectional DC/DC battery charger.

6. The apparatus of claim 3, wherein the at least one energy storage is configured to be one or more batteries of an electric vehicle, EV, and the at least one bidirectional energy storage charger is configured to be a smart bidirectional DC/DC EV charger or a smart EV charger.

7. The apparatus of claim 1, wherein when a specifically coupled controllable DC load is a resistor or a DC motor, a corresponding coupling DC power converter is configured to be a DC/DC converter.

8. The apparatus of claim 1, wherein when a specifically coupled controllable DC load is an induction motor, a corresponding coupling DC power converter is configured to be a DC/AC frequency inverter.

9. The apparatus of claim 1, wherein when a specifically coupled controllable DC load is one or more batteries of an electric vehicle, EV, a corresponding coupling DC power converter is configured to be a DC EV charger.

10. The apparatus of claim 1, wherein the control system is configured to control the voltage on the DC bus through balancing the power flowing to and from the DC bus by coordinative controlling of the power flowing to some, but not all, of the n controllable DC loads.

11. A system comprising:

n DC power converters, and apparatus which for use in a microgrid, the microgrid comprising a DC bus with at least one DC power source connected thereto, an AC bus connected to a power grid that supplies the microgrid, and a DC/AC converter coupling the DC bus and the AC bus, the apparatus comprising:

a control system configured:

to control n DC power converters, n being a positive integer number at least n=1, each of which is configured to couple a respective controllable DC load to the DC bus through the power converter; and to control the power flowing from the DC bus to each of the n controllable DC loads, so as to control each of the n controllable DC loads to fulfil its function and stabilize a voltage on the DC bus.

12. A method of controlling a microgrid which comprises a DC bus with at least one DC power source connected thereto, an AC bus connected to a power grid that supplies the microgrid, loads including at least one controllable DC load and a DC/AC converter coupling the DC bus and the AC bus, the method comprising:

controlling n DC power converters, n being a positive integer number at least n=1, each of which is configured to couple a respective controllable DC load to the DC bus; and controlling power flowing from the DC bus to each of n controllable DC loads, so as to-:

control each of the n controllable DC loads to fulfil its function; and stabilize a voltage on the DC bus.

13. The method of claim 12, the microgrid further comprising at least one energy storage, the method comprising:

periodically updating a power demand forecast from the loads and a power generation forecast from the at least one DC power source, and periodically scheduling power flow profiles for the power flowing to and from the DC bus which satisfy a set of first level control objectives for a defined time window, based at least in part on the power demand forecast from the loads and the power generation forecast from the at least one DC power source; and periodically updating a monitored average power demand from the loads and monitored average power generation from the at least one DC power source for a previous time interval, and periodically determining the power flowing through the DC/AC converter and the power flowing to and from the at least one energy storage if available and which satisfies a set of second level control objectives, based at least in part on the scheduled power flow profiles for the power flowing to and from the DC bus for a present time period, and on the monitored average power demand from the loads and the monitored average power generation from the at least one DC power source for the previous time interval, wherein controlling the power flowing from the DC bus to each of the n controllable DC loads comprises continuously controlling the power flowing to each of the n controllable DC loads to balance the power flowing to and from the DC bus and control the voltage on the DC bus based at least in part on the determined power flowing through the DC/AC converter and the determined power flowing to and from the at least one energy storage if available for a present time interval, and continuously controlling the power flowing through the DC/AC converter and the power flowing to and from the at least one energy storage if available and which satisfies a set of third level control objectives, based at least in part on the determined power flowing through the DC/AC converter and the determined power flowing to and from the at least one energy storage if available for a present time interval, and on instant changes of the power generation from the at least one DC power source and instant changes of the power flowing to the n controllable DC loads.

14. The method of claim 13, the microgrid further comprising AC loads connected to the AC bus and/or uncontrollable DC loads each connected to the DC bus either directly or indirectly through a respective DC power converter, wherein the monitored average power demand from the loads is also based on the power demand from the AC loads and/or the uncontrollable DC loads; and the power flow profiles for the power flowing to and from the DC bus include the power flowing to and from the at least one energy storage, the power flowing to the n controllable DC loads and the power flowing through the DC/AC converter.

15. The method of claim 13, wherein the updating the power demand forecast from the loads and the power generation forecast from the at least one DC power source and the scheduling the power flow profiles for power flowing to and from the DC bus are performed for at least two successive time periods within the defined time window.

16. The method of claim 13, wherein the updating the monitored average power demand from the loads and the updating the monitored average power generation from the at least one DC power source and the determining the power flowing through the DC/AC converter and the determining the power flowing to and from the at least one energy storage if available are performed for at least two successive time intervals within the present time period.

17. The method of claim 13, wherein the set of first level control objectives include at least in part:

maximizing self-consumption of the power generation from the at least one DC power source by the loads in the microgrid;

minimizing reverse power flowing from the microgrid to the power grid;

maximizing financial benefits for end-users of the microgrid; and minimizing power drawn from the power grid to the microgrid at high electricity tariff hours, wherein the set of second level control objectives include at least in part:

stabilizing the power flowing through the DC/AC converter;

stabilizing the power flowing to and from the at least one energy storage if available; and stabilizing the power flowing to the n controllable DC loads which are determined based at least in part on power controllability and power capacity and functions of each of the n controllable DC loads, and wherein the set of third level control objectives include at least in part balancing the power flowing to and from the DC bus; and stabilizing the voltage on the DC bus.

18. The method of claim 12, further comprising:

continuously controlling the power flowing to the n controllable DC loads by following a priority order which is determined based at least in part on power controllability and power capacity and functions of each of the n controllable DC loads.

19. The method of claim 12, further comprising:
updating power flowing through the DC/AC converter and/or power flowing to and from at least one energy storage if available each time balanced power flowing to and from the DC bus are interrupted by at least in part a sizable DC load and/or a DC power source and/or an energy storage connected to or disconnected from the DC bus interruptedly.

20. An apparatus for controlling a microgrid, the microgrid comprising a DC bus with at least one DC power source connected thereto, an AC bus connected to a power grid that supplies the microgrid, loads including at least one controllable DC load and a DC/AC converter coupling the DC bus and the AC bus, the apparatus comprising one or more processors and computer-readable code which, when executed by the one or more processors, cause the one or more processors to perform operations comprising:
controlling n DC power converters, n being a positive integer number at least n=1, each of which is configured to couple a respective controllable DC load to the DC bus_through the converter; and
controlling power flowing from the DC bus to each of n controllable DC loads, so as to:
control each of the n controllable DC loads to fulfil its function; and
stabilize a voltage on the DC bus.

\* \* \* \* \*